(12) United States Patent
Tao et al.

(10) Patent No.: US 12,216,358 B2
(45) Date of Patent: Feb. 4, 2025

(54) BACKLIGHT MODULE AND DISPLAY APPARATUS

(71) Applicants: Hefei Xinsheng Optoelectronics Technology Co., Ltd., Anhui (CN); BOE Technology Group Co., Ltd., Beijing (CN)

(72) Inventors: Ran Tao, Beijing (CN); Haifeng Xu, Beijing (CN); Yu Song, Beijing (CN); Tao Liu, Beijing (CN); Aixia Sang, Beijing (CN)

(73) Assignees: Hefei Xinsheng Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/023,154

(22) PCT Filed: May 26, 2022

(86) PCT No.: PCT/CN2022/095367
§ 371 (c)(1),
(2) Date: Feb. 24, 2023

(87) PCT Pub. No.: WO2023/225964
PCT Pub. Date: Nov. 30, 2023

(65) Prior Publication Data
US 2024/0272483 A1 Aug. 15, 2024

(51) Int. Cl.
*G02B 6/00* (2006.01)
*F21V 8/00* (2006.01)
*G02F 1/13357* (2006.01)

(52) U.S. Cl.
CPC ..... *G02F 1/133615* (2013.01); *G02B 6/0031* (2013.01); *G02B 6/0073* (2013.01); *G02B 6/0088* (2013.01)

(58) Field of Classification Search
CPC .......................... G02F 1/133615; G02B 6/0088
(Continued)

(56) References Cited

U.S. PATENT DOCUMENTS

2006/0061537 A1 3/2006 Yu et al.
2012/0236231 A1\* 9/2012 Choi .................... G02B 6/0031
362/382

(Continued)

FOREIGN PATENT DOCUMENTS

CN 104315415 A 1/2015
CN 205210477 U 5/2016
(Continued)

*Primary Examiner* — Christopher M Raabe
(74) *Attorney, Agent, or Firm* — IPro, PLLC

(57) ABSTRACT

A backlight module and a display apparatus. The backlight module includes: a back panel, including a base plate and a vertical plate connected with an edge of the base plate; the base plate is matched with the vertical plate to form an accommodation space; a light guide plate, located in the accommodation space and having a safety gap with the vertical plate of the back panel; and an optical film, located in the accommodation space and located on a side of the light guide plate away from the base plate. A surface of the light guide plate facing the optical film has a first positioning portion and a second positioning portion; the first positioning portion positions the optical film in a first direction, and the second positioning portion positions the optical film in a second direction. The first direction and the second direction are perpendicular to each other.

20 Claims, 7 Drawing Sheets

(58) Field of Classification Search
USPC .......................................................... 362/97.3
See application file for complete search history.

(56) References Cited

U.S. PATENT DOCUMENTS

| | | | |
|---|---|---|---|
| 2016/0259120 A1 | 9/2016 | Hsiao et al. | |
| 2020/0133065 A1* | 4/2020 | Lou ................... | G02F 1/133602 |
| 2020/0166805 A1* | 5/2020 | Baek ................. | G02F 1/133308 |
| 2020/0192422 A1* | 6/2020 | Hendren .............. | G02B 6/0088 |
| 2020/0319396 A1* | 10/2020 | Qiao ...................... | G02B 6/005 |
| 2022/0342139 A1 | 10/2022 | Hao et al. | |
| 2024/0210759 A1* | 6/2024 | Tao ...................... | G02B 6/0053 |

FOREIGN PATENT DOCUMENTS

| | | |
|---|---|---|
| CN | 105627190 A | 6/2016 |
| CN | 206920778 U | 1/2018 |
| CN | 208902912 U | 5/2019 |
| CN | 111221180 A | 6/2020 |
| CN | 215181302 U | 12/2021 |

* cited by examiner

BACKLIGHT MODULE AND DISPLAY APPARATUS

CROSS REFERENCE TO RELATED APPLICATIONS

The present disclosure is a national phase entry under 35 U.S.C § 371 of International Application No. PCT/CN2022/095367, filed May 26, 2022, and entitled "BACKLIGHT MODULE AND DISPLAY APPARATUS".

FIELD

The present application relates to the field of display devices, in particular to a backlight module and a display apparatus.

BACKGROUND

With the development of vehicle technologies, there are more and more application types and increasing quantity of vehicle display screens. In some technologies, a rotational screen is used in the design of a central control screen of an automobile, and the central control screen can be switched between a landscape state and a portrait state by a rotating device, which is as shown in FIG. 1 to FIG. 2. The rotational screen has the following characteristics: 1. Left and right frames of a module are the same, and upper and lower frames are the same, such that symmetric appearance can be guaranteed. 2. The central control screen is suspended on a central control panel; and in order to make the appearance of the module thinner and lighter, the module usually uses a die-casting back panel, and a client system and appearance members are fixed via die-casting members.

At present, an optical film in a backlight module of a display screen is commonly positioned in a manner that, a positioning boss is arranged on a long side of a light guide plate, and at the same time, the long side is provided with a double-sided tape, so as to fix the optical film and the light guide plate. However, when the technical solution is applied to the rotational screen, in the portrait state, there is no tape to fix a diaphragm on the opposite side of the positioning boss; and in a vibration test, since there is no tape at this side for fixation, and due to the gravity of the optical film, the relative movement between the diaphragms produces friction, which results in scratching of the optical film, thereby affecting picture quality. If the size of the module is larger, the weight of the diaphragm is heavier, resulting in higher risk.

SUMMARY

The present application provides a backlight module and a display apparatus. The backlight module can avoid adverse effects such as scratching of an optical film during mechanical vibration tests.

In order to realize the above objectives, the present application provides the following technical solutions.

A backlight module includes:
- a back panel, including a base plate and a vertical plate connected with an edge of the base plate, the base plate being matched with the vertical plate to form an accommodation space;
- a light guide plate, located in the accommodation space and having a safety gap with the vertical plate of the back panel; and
- an optical film, located in the accommodation space and located on a side of the light guide plate away from the base plate;
- a surface of the light guide plate facing the optical film has a first positioning portion and a second positioning portion: the first positioning portion positions the optical film in a first direction: the second positioning portion positions the optical film in a second direction; and the first direction and the second direction are perpendicular to each other and both parallel to an extending surface of the light guide plate.

The backlight module provided in embodiments of the present application includes the back panel, the light guide plate and the optical film. The back panel includes the base plate and the vertical plate connected with the edge of the base plate, and the base plate is matched with the vertical plate to form the accommodation space. The light guide plate and the optical film are located in the accommodation space. The optical film is located on the side of the light guide plate is away from the base plate. Since the surface of the light guide plate facing the optical film has the first positioning portion and the second positioning portion. The first positioning portion may position the optical film in the first direction, and the second positioning portion may position the optical film in the second direction. When the backlight module is applied to a rotary display screen for a vibration test, the position of the optical film can be fixed under a landscape state and a portrait state simultaneously, such that friction caused by the relative movement between diaphragms of the optical film is avoided, thereby avoiding adverse effects such as scratching of the optical film during a mechanical vibration test.

Optionally, the first positioning portion includes at least one pair of positioning bosses arranged in the second direction. The second positioning portion includes at least one pair of positioning bosses arranged in the first direction. The optical film is located in an area which is defined by the first positioning portion and the second positioning portion. An edge of the optical film has avoidance notches in one-to-one correspondence with the positioning bosses, and the positioning bosses are cooperatively inserted into the corresponding avoidance notches.

Optionally, an edge of a side of the optical film facing the surface of the light guide plate is fixedly bonded to the light guide plate.

Optionally, a gap is provided between a sidewall of the avoidance notch in the optical film and a sidewall of the positioning boss.

Optionally, the light guide plate includes a first side surface and a second side surface that are arranged in the second direction, and a third side surface and a fourth side surface that are arranged in the first direction:
- the first positioning portion includes a first positioning boss and a second positioning boss that are arranged in the second direction at a middle position of the light guide plate: the first positioning boss is arranged close to the first side surface, and the second positioning boss is arranged close to the second side surface;
- the optical film has a first avoidance notch corresponding to the first positioning boss and a second avoidance notch corresponding to the second positioning boss.

Optionally, first double-sided tapes are arranged in areas, which are located on two sides of the second positioning boss, of the light guide plate in the first direction. The light guide plate is bonded to the optical film through the first double-sided tapes.

Optionally, a first preset gap is provided between a sidewall of the first positioning boss facing a side where the second positioning boss is located and a sidewall of the first avoidance notch. A second preset gap is provided between a sidewall of the second positioning boss facing a side where the first positioning boss is located and the sidewall of the second avoidance notch. A width of the first preset gap is greater than that of the second preset gap.

Optionally, a light bar is arranged between the vertical plate and the first side surface, and the light bar is provided with a light source emitting toward the first side surface: the first positioning boss includes a protruding portion which is located on a side of the light source away from the base plate.

Optionally, the second positioning portion includes a third positioning boss and a fourth positioning boss that are oppositely arranged in an area of the light guide plate close to the second side surface in the first direction; the third positioning boss is arranged close to the third side surface, and the fourth positioning boss is arranged close to the fourth side surface.

Optionally, an extending portion protruding towards the vertical plate is arranged at an area of the optical film opposite to the positioning boss.

Optionally, a reflective sheet is arranged between the light guide plate and the base plate: an area of the reflective sheet that faces the surface of the light guide plate and is close to a light entry side of the light guide plate is fixedly bonded to the light guide plate: a surface of the reflective sheet facing the base plate is fixedly bonded to the base plate.

Optionally, the reflective sheet is bonded to the light guide plate through a black and white double-sided tape; and a white tape side of the black and white double-sided tape is bonded to the light guide plate, and a black tape side of the black and white double-sided tape is bonded to the reflective sheet.

Optionally, a side edge of the black and white double-sided tape close to a light entry side of the light guide plate is zigzag-shaped; and the light source on the light bar between the light entry side of the light guide plate and the vertical plate is correspondingly located between two teeth of the black and white double-sided tape.

Optionally, an area of an inner wall of the vertical plate that is located on a side of the optical film away from the base plate is provided with a circle of L-shaped bearing step portion, and the bearing step portion includes a step surface parallel to the base plate:

the backlight module further includes a middle frame located on the step surface, and the middle frame includes a film-pressing plate resting on the step surface: the film-pressing plate covers an edge area of the optical film and an edge area of the light guide plate, and has a light-emitting window: a preset light-shielding distance is provided between an inner edge of the film-pressing plate and the positioning boss of the light guide plate; and the middle frame cooperates with an area of the back panel located on the side of the optical film away from the base plate to form a mounting space.

The present application further provides a display apparatus, including any one of the backlight modules provided in the above technical solutions, and further including a liquid-crystal display panel located in the mounting space, and a cover plate covering a side of the mounting space away from the base plate.

REFERENCE SIGNS

11—base plate; 12—vertical plate; 2—light guide plate; 21—positioning boss; 211—first positioning boss; 212—second positioning boss; 213—third positioning boss; 214—fourth positioning boss; 221—first side surface; 222—second side surface; 223—third side surface; 224—fourth side surface; 3—optical film; 31—avoidance notch; 311—first avoidance notch; 312—second avoidance notch; 32—extending portion; 4—light bar; 41—light source; 5—reflective sheet; 61—first double-sided tape; 62—black and white double-sided tape; 63—second double-sided tape; 7—middle frame; 71—film-pressing plate; 8—liquid crystal display panel; 9—cover plate.

DETAILED DESCRIPTION OF THE EMBODIMENTS

The technical solutions in the embodiments of the present application will be clearly and completely described below in combination with the drawings in the embodiments of the present application. It is apparent that the described embodiments are only part of the embodiments of the present application, not all the embodiments. All other embodiments obtained by those of ordinary skill in the art on the basis of the embodiments in the present application without creative work all fall within the scope of protection of the present application.

Figure 1:
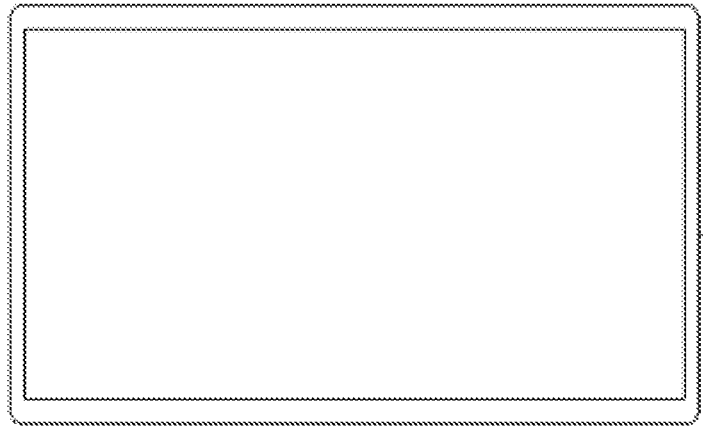
FIG. 1 is a schematic diagram of a rotary display screen in a landscape state.
Figure 2:
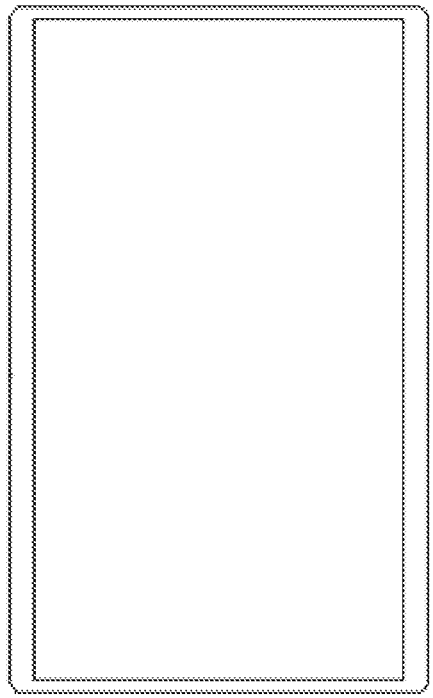
FIG. 2 is a schematic diagram of a rotary display screen in a portrait state.
Figure 3:
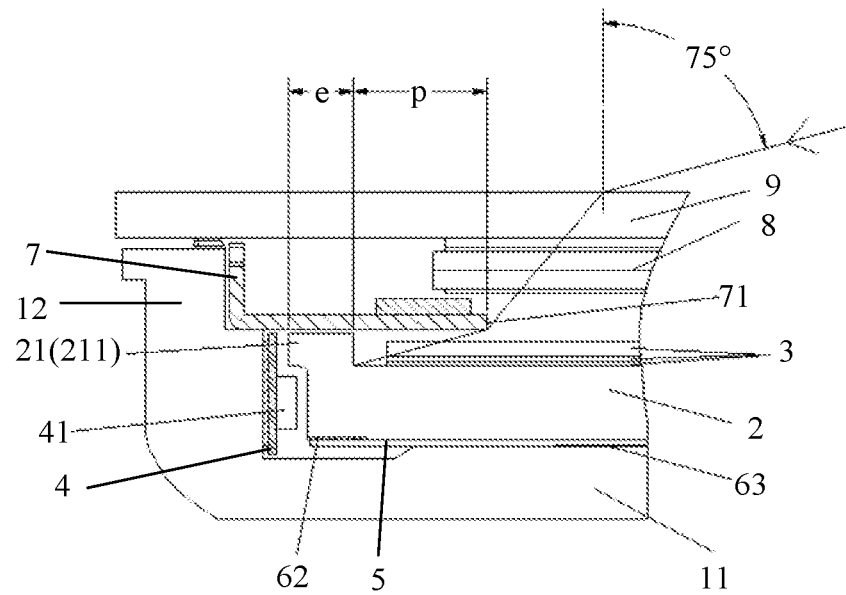
FIG. 3 is a section view of a display apparatus according to an embodiment of the present application.
Figure 4:
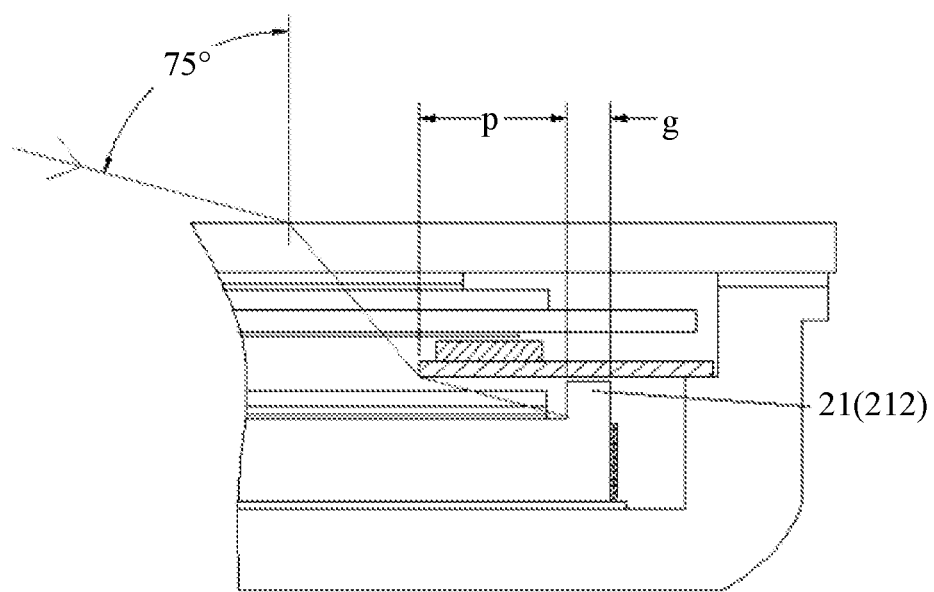
FIG. 4 is a section view of another display apparatus according to an embodiment of the present application.

Referring to FIG. 3 and FIG. 4, the present application provides a backlight module, including:

a back panel, including a base plate 11 and a vertical plate 12 connected with an edge of the base plate 11, the base plate 11 is matched with the vertical plate 12 to form an accommodation space;

a light guide plate 2, located in the accommodation space and having a safety gap with the vertical plate 12 of the back panel; and an optical film 3, located in the accommodation space and located on a side of the light guide plate 2 away from the base plate 11.

A surface of the light guide plate 2 facing the optical film 3 has a first positioning portion and a second positioning portion. The first positioning portion positions the optical film 3 in a first direction, and the second positioning portion positions the optical film 3 in a second direction. The first direction and the second direction are perpendicular to each other and both parallel to an extending surface of the light guide plate 2.

The backlight module provided in embodiments of the present application includes the back panel, the light guide plate 2 and the optical film 3. The back panel includes the base plate 11 and the vertical plate 12 connected with the edge of the base plate 11, and the base plate 11 is matched with the vertical plate 12 to form the accommodation space. The light guide plate 2 and the optical film 3 are located in the accommodation space. The optical film 3 is located on the side of the light guide plate 2 away from the base plate 11. Since the surface of the light guide plate 2 facing the optical film 3 has the first positioning portion and the second positioning portion, the first positioning portion may position the optical film 3 in the first direction, and the second positioning portion may position the optical film 3 in the second direction. When the backlight module is applied to a rotary display screen for a vibration test, the position of the optical film 3 can be fixed under a landscape state and a portrait state simultaneously, such that friction caused by the relative movement between diaphragms of the optical film 3 is avoided, thereby avoiding adverse effects such as scratching of the optical film 3 during a mechanical vibration test.

In some embodiments, as shown in FIG. 5-FIG. 9, the above first positioning portion may include at least one pair of positioning bosses 21 arranged in the second direction. The second positioning portion may include at least one pair of positioning bosses 21 arranged in the first direction. The optical film 3 is located in an area which is defined by the first positioning portion and the second positioning portion, and an edge of the optical film 3 has avoidance notches 31 in one-to-one correspondence with the positioning bosses 21. The positioning bosses 21 are cooperatively inserted into the corresponding avoidance notches 31. In the above structure, the positioning bosses in the first positioning portion can limit the movement of the optical film 3 in the first direction, and the positioning bosses in the second positioning portion can limit the movement of the optical film 3 in the second direction.

Figure 5:
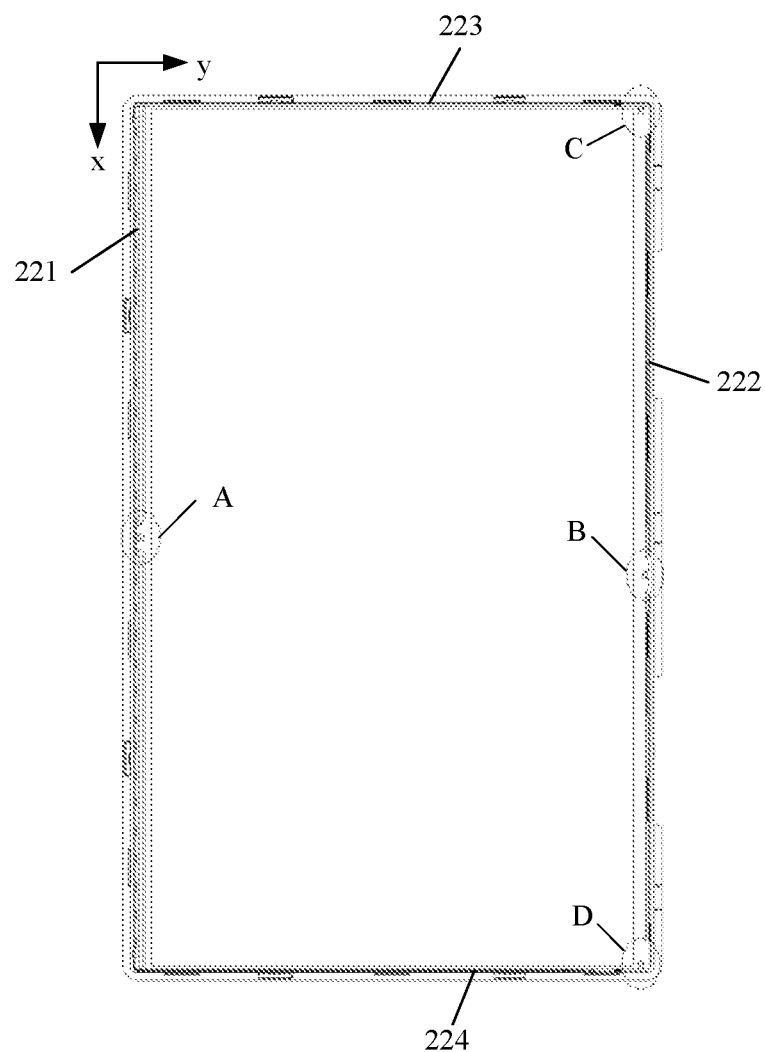
FIG. 5 is a schematic structural diagram of a backlight module according to an embodiment of the present application.

As shown in FIG. 5, the first direction may be a long side direction x of the light guide plate 2, and the second direction may be a short side direction y of the light guide plate 2. Since frames of two opposite sides of a rotary display screen are identical, the positioning bosses 21 may be arranged at two opposite edge areas of the light guide plate 2 compared with a positioning mode of an optical diaphragm of a conventional backlight module. When the above structure is applied to the rotary display screen, the optical film 3 can be supported via the positioning bosses 21 regardless of the landscape state or the portrait state during a vibration test, and the movement of the diaphragms in the optical film 3 is limited, such that relative friction between the diaphragms is avoided, which prevents the diaphragms in the optical film 3 from being scratched, to avoid the impact on the display quality.

In some embodiments, as shown in FIG. 6 to FIG. 9, the positioning boss 21 may be in a shape of a rectangle or other shapes, and may be set according to actual situations, which is not limited herein.

Figure 10:
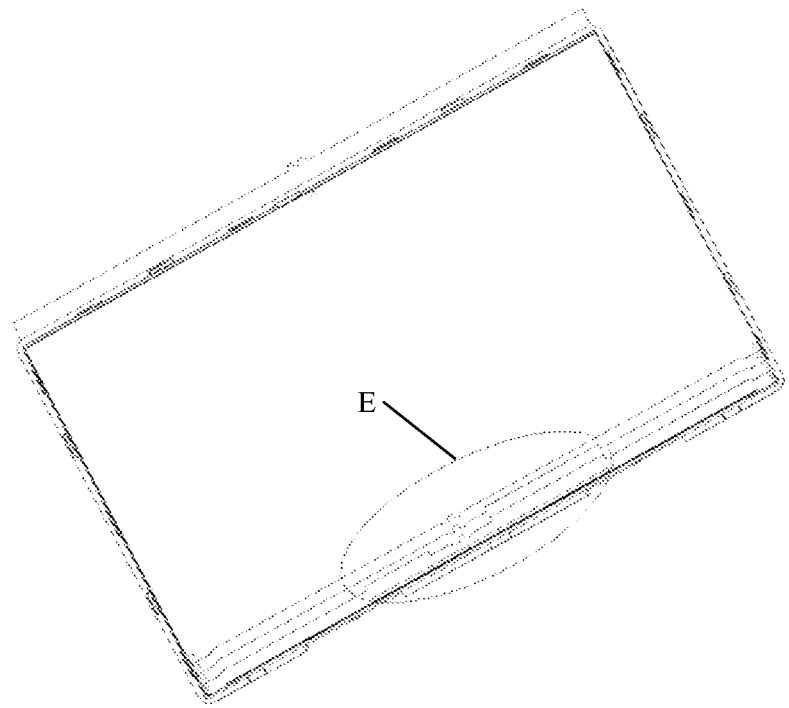
FIG. 10 is an explosive view of a backlight module according to an embodiment of the present application.
Figure 11:
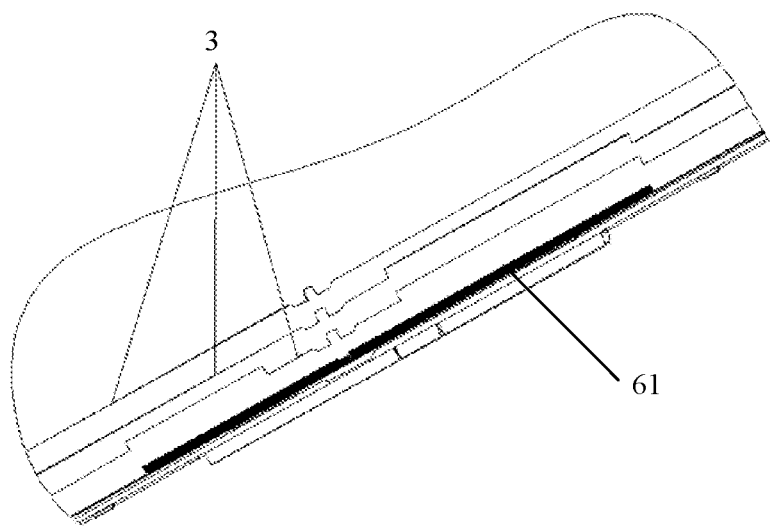
FIG. 11 is an enlarged view of an area E in FIG. 10.

In some embodiments, as shown in FIG. 10 and FIG. 11, the optical film 3 may structurally include a plurality of layers of stacked diaphragms such as a diffusion sheet and a prism sheet on the light guide plate 2. By means of forming the avoidance notches 31 in the diaphragms, the positioning bosses on the light guide plate 2 can position the diaphragms, such that mutual movement during the vibration test is prevented from generating adverse scratching.

In the backlight module provided in the above embodiments, an edge of a side of the optical film 3 facing the surface of the light guide plate 2 is fixedly bonded to the light guide plate 2, such that the position of the optical film 3 can be fixed. Optionally, the optical film 3 may be bonded to the light guide plate 2 through a double-sided tape.

In some embodiments, a gap is provided between a sidewall of the avoidance notch 31 in the optical film 3 and a sidewall of the corresponding positioning boss 21, and under the condition that the edge of the side of the optical film 3 is fixed, the flatness of the optical film 3 on the light guide plate 2 can be guaranteed when the avoidance notch and the positioning boss have manufacturing tolerance. The specific size of the gap between the sidewall of the avoidance notch and the sidewall of the positioning boss may be determined according to actual situations, which is not limited herein.

Figure 6:
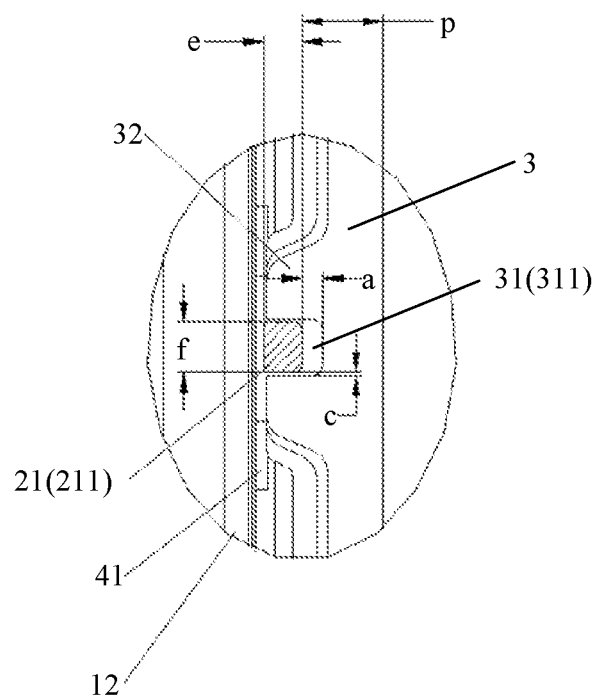
FIG. 6 is an enlarged view of an area A in FIG. 5.
Figure 7:
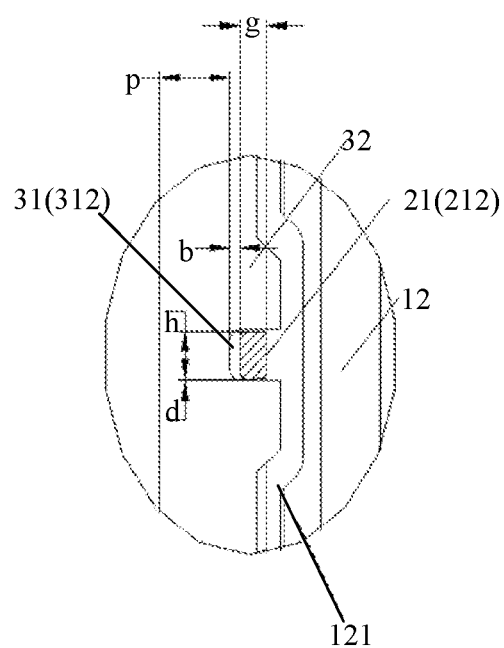
FIG. 7 is an enlarged view of an area B in FIG. 5.

In the backlight module provided in the above embodiments, as shown in FIG. 5, the light guide plate 2 may include a first side surface 221 and a second side surface 222 that are arranged in the first direction, and a third side surface 223 and a fourth side surface 224 that are arranged in the second direction. At this point, as shown in FIG. 5 to FIG. 7, the first positioning portion may include a first positioning boss 211 and a second positioning boss 212 that are arranged in the second direction at a middle position of the light guide plate 2. The first positioning boss 211 is arranged close to the first side surface 221, and the second positioning boss 212 is arranged close to the second side surface 222. The optical film 3 has a first avoidance notch 311 corresponding to the first positioning boss 211 and a second avoidance notch 312 corresponding to the second positioning boss 212. For example, as shown in FIG. 5, when the rotary display screen is in the portrait state, the first positioning portion can well support the optical film 3, such that friction caused by the relative movement between the diaphragms in the optical film 3 can be avoided when the vibration test is performed, so as to prevent the diaphragms from being scratched.

In some embodiments, as shown in FIG. 11, first double-sided tapes 61 may be arranged in areas, which are located on two sides of the second positioning boss 212, of the light guide plate 2 in the first direction, and the light guide plate 2 is bonded to the optical film 3 through the first double-sided tapes 61, such that the light guide plate 2 and the side edge of the optical film 3 can be fixed.

In some embodiments, as shown in FIG. 6 and FIG. 7, a first preset gap is provided between the sidewall of the first positioning boss 211 facing the side where the second positioning boss 212 is located and the sidewall of the first avoidance notch 311. A second preset gap is provided between the sidewall of the second positioning boss 212 facing the side where the first positioning boss 211 is located and the sidewall of the second avoidance notch 312. A width a of the first preset gap may be set to be greater than a width b of the second preset gap. When the edge of the optical film 3 corresponding to the second positioning boss 212 is fixedly bonded to the light guide plate 2, the width a of the first preset gap is set to be greater than the width b of the second preset gap, such that the flatness of the optical film on the light guide plate 2 is guaranteed when the optical film 3 or the light guide plate 2 has manufacturing tolerance.

In the actual application, the width a of the first preset gap may be 0.8 mm-1.5 mm, for example, the width a of the first preset gap may be 0.9 mm. The width b of the second preset gap may be 0.3 mm-0.6 mm, for example, the width b of the second preset gap may be 0.45 mm. A width c of the gap between the first positioning boss 211 and the first avoidance notch 311 in the first direction and a width d of the gap between the second positioning boss 212 and the second avoidance notch 312 in the first direction may be 0.1 mm-0.15 mm, for example, may be 0.15 mm.

In the backlight module provided in the above embodiment, as shown in FIG. 3, a light bar 4 may be arranged between the vertical plate 12 and the first side surface 221, and a light source 41 emitting toward the first side surface 221 is arranged on the light bar 4. The first positioning boss 211 includes a protruding portion which is located on a side of the light source 41 away from the base plate 11, such that the width of the first positioning boss 211 in the second direction can be increased, the sizes and areas of the positioning bosses are enlarged, and the strength of the first positioning boss 211 can be guaranteed, thereby guaranteeing that the first positioning boss 211 and the second positioning boss 212 can support the optical film 3 when the display screen is in the portrait state. The light source 41 on the light bar 4 may be an LED lamp.

In some embodiments, as shown in FIG. 3 and FIG. 6, a width e of the first positioning boss 211 in the second direction may be greater than or equal to 1.6 mm, and a width f of the first positioning boss 211 in the first direction may be greater than or equal to 2 mm, such that the support strength of the first positioning portion to the optical film can be guaranteed, wherein the width may be selected and set according to the actual situations. Since the area of the light guide plate 2 close to the second side surface 222 is fixedly bonded to the optical film 3 through the first double-sided tapes 61, the second positioning boss 212 is not subjected to force and only plays the roles of assembling and positioning the diaphragms. Therefore, as shown in FIG. 4 and FIG. 7, a width h of the second positioning boss 212 in the first direction may be less than the width f of the first positioning boss 211 in the first direction, and a width g of the second positioning boss 212 in the second direction may be less than the width e of the first positioning boss 211 in the second direction. For example, the width g of the second positioning boss 212 in the second direction may be 1.0 mm-1.5 mm, and the width h of the second positioning boss 212 in the first direction may be 1.5 mm-2.0 mm.

Figure 8:
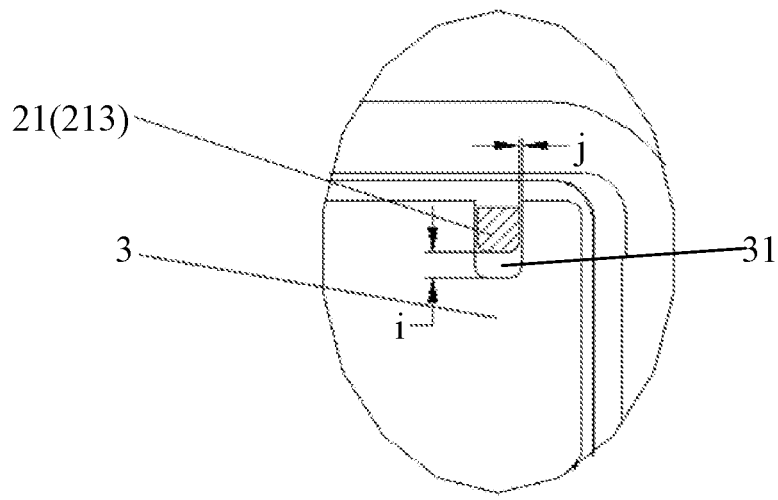
FIG. 8 is an enlarged view of an area C in FIG. 5.
Figure 9:
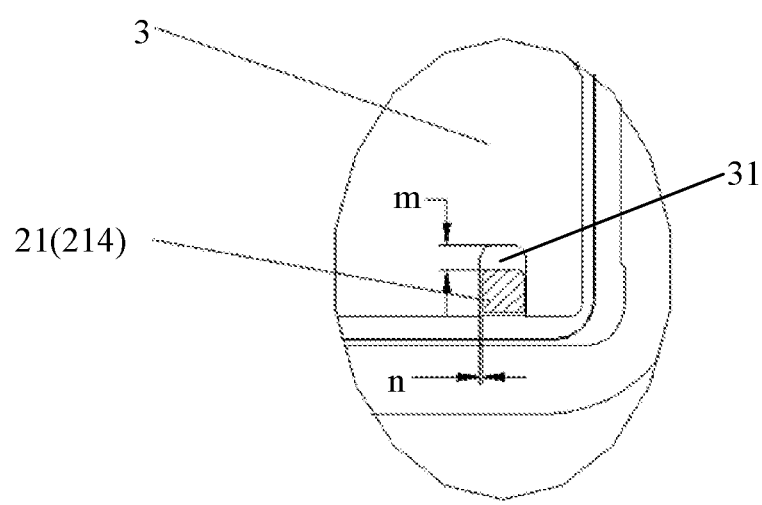
FIG. 9 is an enlarged view of an area D in FIG. 5.

In the backlight module provided in the above embodiments, as shown in FIG. 5. FIG. 8 and FIG. 9, the second positioning portion may include a third positioning boss 213 and a fourth positioning boss 214 that are oppositely arranged in the first direction at an area of the light guide plate 2 close to the second side surface 222. The third positioning boss 213 is arranged close to the third side surface 223, and the fourth positioning boss 214 is arranged close to the fourth side surface 224. The second positioning boss, the third positioning boss and the fourth positioning boss are all located on one side. The first positioning boss 211 is arranged on the side opposite to the second positioning boss, such that flat spreading of the optical film 3 can be guaranteed, thereby avoiding poor display.

In the actual application, as shown in FIG. 8 and FIG. 9, a width i of the gap between the third positioning boss 213 and the avoidance notch corresponding to the third positioning boss in the first direction and a width m of the gap between the fourth positioning boss 214 and the avoidance notch corresponding to the fourth positioning boss in the first direction may both be 0.7 mm-1.5 mm, for example, may be 0.9 mm. A width j of the gap between the third positioning boss 213 and the avoidance notch corresponding to the third positioning boss in the second direction and the width n of the gap between the fourth positioning boss 214 and the avoidance notch corresponding to the fourth positioning boss in the second direction may be 0.1 mm-0.15 mm, for example, may be 0.15 mm. The widths of the third positioning boss 213 and the fourth positioning boss 214 in the first direction and the second direction may be determined according to actual situations, which are not limited herein.

In the backlight module provided in the above embodiments, as shown in FIG. 6 and FIG. 7, an area of the optical film 3 opposite to the positioning boss is provided with an extending portion 32 protruding towards the vertical plate 12, and the avoidance notch may be arranged in the area where the extending portion 32 is located. By arranging the extending portion 32, the area that the optical film 3 effectively covers the light guide plate 2 can be enlarged, and the widths of frame areas of the display screen can be reduced, an avoidance slot may be provided in an area of the inner wall of the vertical plate 12 corresponding to the extending portion 32, and the extending portion 32 may be inserted into the avoidance slot, such that the optical film 3 can be further fixed.

In the backlight module provided in the above embodiments, as shown in FIG. 3, a reflective sheet 5 is arranged between the light guide plate 2 and the base plate 11. An area of the reflective sheet 5 that faces the surface of the light guide plate 2 and is close to a light entry side of the light guide plate 2 is fixedly bonded to the light guide plate 2, and a surface of the reflective sheet 5 facing the base plate 11 is fixedly bonded to the base plate 11, such that the light guide plate 2 can be fixedly connected with a back panel, thereby preventing mesh abrasion on the light guide plate 2 caused by the shaking during the vibration test. The light entry side of the light guide plate 2 may be the side where the first side surface 221 is located.

In some embodiments, the reflective sheet 5 may be bonded to the light guide plate 2 through a black and white double-sided tape 62. A white tape side of the black and white double-sided tape 62 is bonded to the light guide plate 2, and a black tape side of the black and white double-sided tape 62 is bonded to the reflective sheet 5, such that fixation between the light guide plate 2 and the reflective sheet 5 can be realized.

Figure 12:
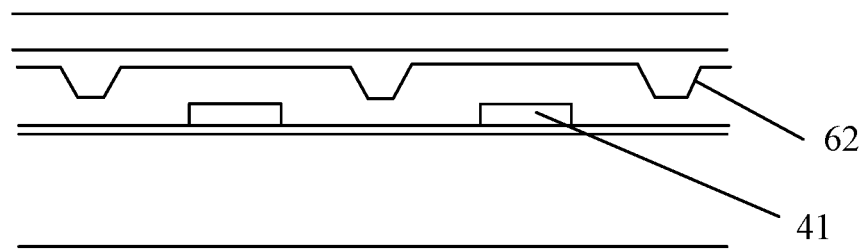
FIG. 12 is a section view of a backlight module according to an embodiment of the present application.

In some embodiments, as shown in FIG. 12, an edge of the black and white double-sided tape 62 close to the light entry side of the light guide plate 2 may be zigzag-shaped. The light source 41 on the light bar 4 between the light entry side of the light guide plate 2 and the vertical plate 12 is correspondingly located between two teeth of the black and white double-sided tape 62. The black and white double-sided tape 62 has a gathering effect on light emitted by the light source 41 on the light bar 4, and the light shadow phenomenon appears, thereby affecting a display effect to a certain extent. In order to avoid the light shadow phenomenon, the edge of the black and white double-sided tape 62 is set to be zigzag-shaped. The light source 41 is located between the two teeth of the black and white double-sided tape 62. That is to say, an attachment area may be increased by arranging toothed protrusions outside a light-emitting area of the light source 41, and the width of the black and white double-sided tape 62 in the light-emitting area of the light source 41 may be narrower, to reduce light gathering of the white tape.

In some embodiments, the reflective sheet 5 may be bonded to the back panel through a second double-sided tape 63. By means of the action of the black and white double-sided tape 62 and the second double-sided tape 63, fixation between the light guide plate 2 and the back panel can be realized, and the assembling strength of the backlight module can be increased.

In the backlight module provided in the above embodiments, as shown in FIG. 3 and FIG. 4, an area of an inner wall of the vertical plate 12 that is located on the side of the optical film 3 away from the base plate 11 is provided with a circle of L-shaped bearing step portion, and the bearing step portion includes a step surface parallel to the base plate 11. The backlight module further includes a middle frame 7 located on the step surface, and the middle frame 7 includes a film-pressing plate 71 resting on the step surface. The film-pressing plate 71 covers an edge area of the optical film 3 and an edge area of the light guide plate 2, and has a light-emitting window: A preset light-shielding distance is provided between an inner edge of the film-pressing plate 71 and the positioning boss 21 of the light guide plate 2. The middle frame 7 cooperates with an area of the back panel located on the side of the optical film 3 away from the base plate 11 to form a mounting space. Since bright spots are produced at the positioning bosses of the light guide plate 2, in order to prevent the bright spots on the bosses from affecting pictures, the preset light-shielding distance between the inner edge of the film-pressing plate 71 and the positioning boss 21 of the light guide plate 2 is required, such that the film-pressing plate 71 can shield the positioning boss, and a user cannot see bright spots on the boss at any viewing angle. Optionally, as shown in FIG. 3 and FIG. 4, the distance p between the inner edge of the film-pressing plate 71 and the positioning boss 21 may be set to be greater than or equal to 3.6 mm, which may be calculated according to a viewing angle of 75° in which the bright spots are not visible, wherein a specific value may be set according to the actual situations, which is not limited herein.

The present application further provides a display apparatus. The display apparatus includes any one of the backlight modules provided in the above technical solutions, as shown in FIG. 3 and FIG. 4, and further includes a liquid crystal display panel 8 located in a mounting space, and a cover plate 9 covering a side of the mounting space away from a base plate 11. The cover plate 9 may be fixedly bonded to an end portion of a vertical plate 12 away from the base plate 11. The liquid crystal display panel 8 may be fixedly bonded to the cover plate 9. Foam may be arranged in an area of a film-pressing plate 71 opposite to the liquid crystal display panel 8, so as to protect the liquid crystal display panel 8. Specifically, the display apparatus may be a vehicle-mounted rotary display screen, or may be another display apparatus, which is not limited herein.

It is apparent that those skilled in the art may make various modifications and variations to the embodiments of the present application without departing from the spirit and scope of the present application. Therefore, if such modifications and variations of the embodiments of the present application fall within the scope of the appended claims and equivalent technologies thereof, the present application is also intended to cover the modifications and variations.

What is claimed is:

1. A backlight module, comprising:
   a back panel, comprising a base plate and a vertical plate connected with an edge of the base plate, wherein the base plate is matched with the vertical plate to form an accommodation space;
   a light guide plate, located in the accommodation space and having a safety gap with the vertical plate of the back panel;
   an optical film, located in the accommodation space and located on a side of the light guide plate away from the base plate;
   wherein a surface of the light guide plate facing the optical film has a first positioning portion and a second positioning portion, the first positioning portion positions the optical film in a first direction, the second positioning portion positions the optical film in a second direction, and the first direction and the second direction are perpendicular to each other and both parallel to an extending surface of the light guide plate;
   the first positioning portion comprises at least one pair of positioning bosses arranged in the second direction; the second positioning portion comprises at least one pair of positioning bosses arranged in the first direction; the optical film is located in an area defined by the first positioning portion and the second positioning portion, and an edge of the optical film has avoidance notches in one-to-one correspondence with the positioning bosses; and the positioning bosses are cooperatively inserted into the corresponding avoidance notches;
   an edge of a side of the optical film facing the surface of the light guide plate is fixedly bonded to the light guide plate;
   a gap is provided between a sidewall of the avoidance notch in the optical film and a sidewall of the positioning boss.

2. The backlight module according to claim 1, wherein the light guide plate comprises a first side surface and a second side surface arranged in the second direction, and a third side surface and a fourth side surface that are arranged in the first direction;
   the first positioning portion comprises a first positioning boss and a second positioning boss arranged in the second direction at a middle position of the light guide plate, the first positioning boss is arranged close to the first side surface, and the second positioning boss is arranged close to the second side surface; and
   the optical film has a first avoidance notch corresponding to the first positioning boss and a second avoidance notch corresponding to the second positioning boss.

3. The backlight module according to claim 2, wherein first double-sided tapes are arranged in areas, located on two sides of the second positioning boss, of the light guide plate in the first direction; and the light guide plate is bonded to the optical film through the first double-sided tapes.

4. The backlight module according to claim 3, wherein a first preset gap is provided between a sidewall of the first positioning boss facing a side where the second positioning boss is located and a sidewall of the first avoidance notch; a second preset gap is provided between a sidewall of the second positioning boss facing a side where the first positioning boss is located and a sidewall of the second avoidance notch; and a width of the first preset gap is greater than a width of the second preset gap.

5. The backlight module according to claim 2, wherein a light bar is arranged between the vertical plate and the first side surface; the light bar is provided with a light source emitting toward the first side surface; and the first positioning boss comprises a protruding portion located on a side of the light source away from the base plate.

6. The backlight module according to claim 2, wherein the second positioning portion comprises a third positioning boss and a fourth positioning boss that are oppositely arranged in the first direction at an area of the light guide plate close to the second side surface; the third positioning boss is arranged close to the third side surface; and the fourth positioning boss is arranged close to the fourth side surface.

7. The backlight module according to claim 1, wherein an extending portion protruding towards the vertical plate is arranged at an area of the optical film opposite to the positioning boss.

8. The backlight module according to claim 1, wherein a reflective sheet is arranged between the light guide plate and the base plate; an area of the reflective sheet that faces the surface of the light guide plate and is close to a light entry side of the light guide plate is fixedly bonded to the light guide plate; and a surface of the reflective sheet facing the base plate is fixedly bonded to the base plate.

9. The backlight module according to claim 8, wherein the reflective sheet is bonded to the light guide plate through a black and white double-sided tape; and a white tape side of the black and white double-sided tape is bonded to the light guide plate, and a black tape side of the black and white double-sided tape is bonded to the reflective sheet.

10. The backlight module according to claim 9, wherein an edge of the black and white double-sided tape close to the light entry side of the light guide plate is zigzag-shaped; and the light source on the light bar between the light entry side of the light guide plate and the vertical plate is correspondingly located between two teeth of the black and white double-sided tape.

11. The backlight module according to claim 1, wherein an area of an inner wall of the vertical plate located on a side of the optical film away from the base plate is provided with a circle of L-shaped bearing step portion, and the bearing step portion comprises a step surface parallel to the base plate;
the backlight module further comprises a middle frame located on the step surface, and the middle frame comprises a film-pressing plate resting on the step surface; the film-pressing plate covers an edge area of the optical film and an edge area of the light guide plate, and has a light-emitting window; a preset light-shielding distance is provided between an inner edge of the film-pressing plate and the positioning boss of the light guide plate; and the middle frame cooperates with an area of the back panel located on the side of the optical film away from the base plate to form a mounting space.

12. A display apparatus, comprising the backlight module according to claim 1, and further comprising a liquid crystal display panel located in a mounting space, and a cover plate covering a side of the mounting space away from the base plate.

13. A backlight module, comprising:
a back panel, comprising a base plate and a vertical plate connected with an edge of the base plate, wherein the base plate is matched with the vertical plate to form an accommodation space;
a light guide plate, located in the accommodation space and having a safety gap with the vertical plate of the back panel;
an optical film, located in the accommodation space and located on a side of the light guide plate away from the base plate;
wherein a surface of the light guide plate facing the optical film has a first positioning portion and a second positioning portion, the first positioning portion positions the optical film in a first direction, the second positioning portion positions the optical film in a second direction, and the first direction and the second direction are perpendicular to each other and both parallel to an extending surface of the light guide plate;
the first positioning portion comprises at least one pair of positioning bosses arranged in the second direction; the second positioning portion comprises at least one pair of positioning bosses arranged in the first direction; the optical film is located in an area defined by the first positioning portion and the second positioning portion, and an edge of the optical film has avoidance notches in one-to-one correspondence with the positioning bosses; and the positioning bosses are cooperatively inserted into the corresponding avoidance notches;
an area of an inner wall of the vertical plate located on a side of the optical film away from the base plate is provided with a circle of L-shaped bearing step portion, and the bearing step portion comprises a step surface parallel to the base plate;
the backlight module further comprises a middle frame located on the step surface, and the middle frame comprises a film-pressing plate resting on the step surface; the film-pressing plate covers an edge area of the optical film and an edge area of the light guide plate, and has a light-emitting window; a preset light-shielding distance is provided between an inner edge of the film-pressing plate and the positioning boss of the light guide plate; and the middle frame cooperates with an area of the back panel located on the side of the optical film away from the base plate to form a mounting space.

14. The backlight module according to claim 13, wherein the light guide plate comprises a first side surface and a second side surface arranged in the second direction, and a third side surface and a fourth side surface that are arranged in the first direction;
the first positioning portion comprises a first positioning boss and a second positioning boss arranged in the second direction at a middle position of the light guide plate, the first positioning boss is arranged close to the first side surface, and the second positioning boss is arranged close to the second side surface; and
the optical film has a first avoidance notch corresponding to the first positioning boss and a second avoidance notch corresponding to the second positioning boss.

15. The backlight module according to claim 14, wherein first double-sided tapes are arranged in areas, located on two sides of the second positioning boss, of the light guide plate in the first direction; and the light guide plate is bonded to the optical film through the first double-sided tapes.

16. The backlight module according to claim 15, wherein a first preset gap is provided between a sidewall of the first positioning boss facing a side where the second positioning boss is located and a sidewall of the first avoidance notch; a second preset gap is provided between a sidewall of the second positioning boss facing a side where the first positioning boss is located and a sidewall of the second avoidance notch; and a width of the first preset gap is greater than a width of the second preset gap.

17. The backlight module according to claim 14, wherein a light bar is arranged between the vertical plate and the first side surface; the light bar is provided with a light source emitting toward the first side surface; and the first positioning boss comprises a protruding portion located on a side of the light source away from the base plate.

18. The backlight module according to claim 14, wherein the second positioning portion comprises a third positioning boss and a fourth positioning boss that are oppositely arranged in the first direction at an area of the light guide plate close to the second side surface; the third positioning boss is arranged close to the third side surface; and the fourth positioning boss is arranged close to the fourth side surface.

19. The backlight module according to claim 13, wherein an extending portion protruding towards the vertical plate is arranged at an area of the optical film opposite to the positioning boss.

20. A display apparatus, comprising the backlight module according to claim 13, and further comprising a liquid crystal display panel located in a mounting space, and a cover plate covering a side of the mounting space away from the base plate.

\* \* \* \* \*